Figure 1:
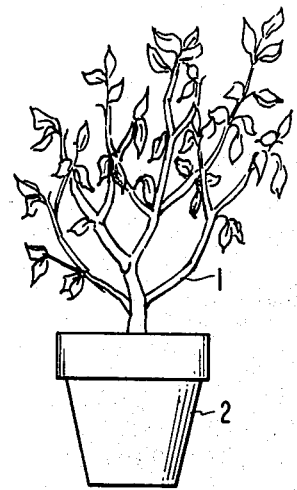

United States Patent [19]

O'Hare

[11] 4,399,634
[45] Aug. 23, 1983

[54] SIMPLIFIED ROOT AUGMENTATION SYSTEM FOR HYDROPONICS

[76] Inventor: Louis R. O'Hare, 1700 Banyan, Apt. 3, Fort Collins, Colo. 80526

[21] Appl. No.: 315,718

[22] Filed: Oct. 27, 1981

[51] Int. Cl.³ .............................................. A01G 31/02
[52] U.S. Cl. ............................................ 47/59; 47/63
[58] Field of Search ............................... 47/59, 63, 58

[56] References Cited

U.S. PATENT DOCUMENTS

| | | | |
|---|---|---|---|
| 3,931,695 | 1/1976 | Widmayer | 47/59 X |
| 4,115,950 | 9/1978 | Lantai | 47/58 |
| 4,166,341 | 9/1979 | Vestergaard | 47/59 |

*Primary Examiner*—Robert E. Bagwill

[57] ABSTRACT

A unique hydroponic system for growing plants in nutrient aerosol spray is provided by a change in the growth cycle of plants when a secondary system of roots is produced after some initial plant development and, as the secondary system is developed from the plant's branches, the secondary roots are already suspended in an air environment and subsequently become an air-suspended root system and then the principal root system of the plant. Since the new roots are developed by a special type of air-layering which is a nutrient spray type of air-layering, this system improves former systems in that it removes the time consuming requirement of transplantation, the initial roots merely remaining in place while the air-layered roots developed from the branches become a very augmented root system and remain in the same position to continue to receive the nutrient spray. A perforated cover together with a nutrient spray are merely set in place over the plant at a stage in its growth in order to implement this system.

7 Claims, 10 Drawing Figures

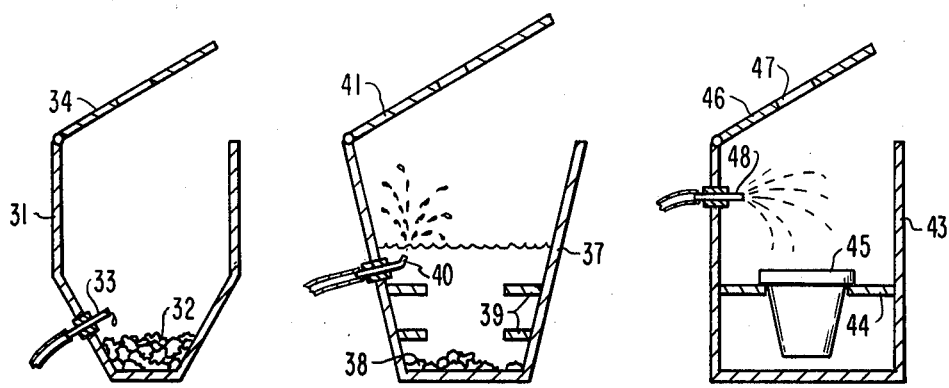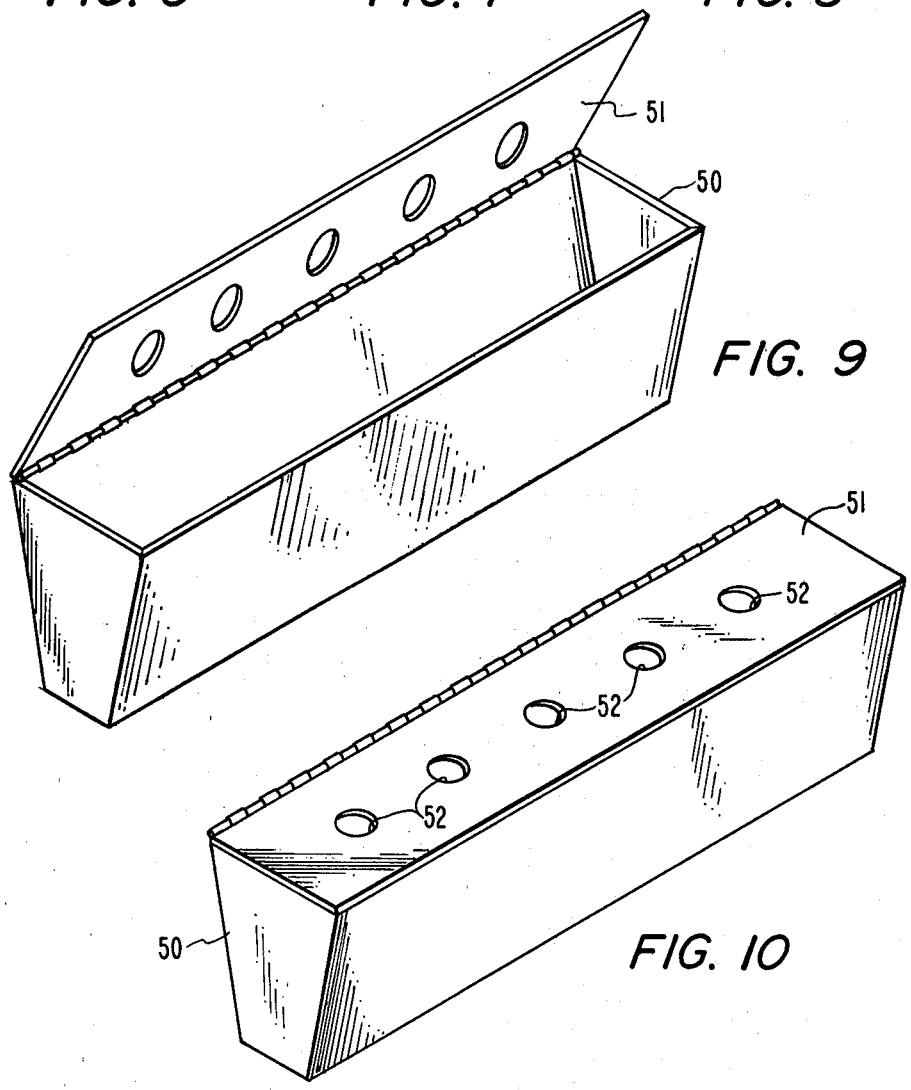

SIMPLIFIED ROOT AUGMENTATION SYSTEM FOR HYDROPONICS

This invention is a type of hydroponic system for the rapid growing of plants. It is an agricultural method of plant culture that can be used in open field farming as well as in greenhouse enclosures and it can be used as an adjunct to soil culture or it can be used solely as a hydroponic system. The invention uses some previously known botanical phenomena in an unusual way and with modifications. Some are used for different purposes from those for which they are ordinarily used, and previously unrelated horticultural practices are combined to provide a unique sequence of steps for more rapid hydroponic plant growth. In turn these steps cause plants to develop according to an artificial cycle that is quite different from their growth pattern in nature. The new cycle changes the plant's morphology and its growth rate and adapts the plant to more readily receive nutrient hydroponic solution. An object of the invention is to grow a plant according to a cycle that interrupts its natural cycle after the plant has formed considerable branch and leaf structure and then to cause the plant to convert much of its present branch and leaf structure to a specialized type of root system and then to cause the plant to further develop with new branches and leaf structure using its newly formed specialized root system. The specialized root system that is formed in situ relies on the advances of former art because it is now adapted with a larger than normal root system to receive nutrient spray for the continuing nourishment of the growing plant. Since the nutrient spray system is already known for its effectiveness in achieving rapid chemical assimilation by the plant, it is an ideal compliment to the augmented root system. However, in this present invention not only are these two advantages combined but also a means of suspending the root system without any transplantation steps is set forth. An object of this invention then is to provide an aerosol hydroponic system that removes the costly transplantation requirement. According to this object the plant need not be moved nor do its roots need to be cleaned and adapted to hydroponic solution because a new and different set of roots will be used while the plant remains in the same place. Since there is no requirement to transplant, there is greatly reduced requirement for physically supporting the plant with its roots suspended in the air because in this inventive concept the first set of roots maintains its purchase in its original nutrient system and this assists in supporting the new system above.

This present invention is also related to a former botanical art known as air-layering in that something similar to the practice of air-layering takes place. Formerly roots have been produced on branches when a bag of moist nutrient soil was tied to the branch in such a way that the soil was in contact with the branch. When the roots began to grow from the branch into the bag, the branch was removed from the parent plant and transplanted into the earth. However, in this present invention rather than being used as a system of cloning or of producing a new plant from a parent plant, the layering principle is used as a means of providing an augmented root system for the plant itself and finally for providing a new principal root system of the plant itself. In this invention because the layering is not accomplished in a contional way with nutrient soil suspended on a branch but rather by a spray of nutrient on the branch and shielding from light, there is no need for further steps after the layering to provide for new subsequent nourishment. The same spray that provided the nutrient for layering continues the nourishment of the whole plant after it has generated the new roots. In terms of the objectives of the invention then this invention has for its object to provide an improved hydroponic system by incorporating into the system a means of root mass augmentation. The object is to effect this root mass increase by a kind of air-layering that is compatible with a liquid nourishment system namely, a liquid air-layering system. Finally, the overriding objective of the invention is in view of the world population increase in the face of the reduction of arable land. The invention seeks to provide a high density, high yield food growing system which requires a minimum of production steps and a modicum of equipment.

Clarification of the means of achieving these objectives by the various embodiments of the invention may be had by referring to the drawings.

FIG. 1 of the drawings shows a small plant growing in a flower pot.

Figure 2:
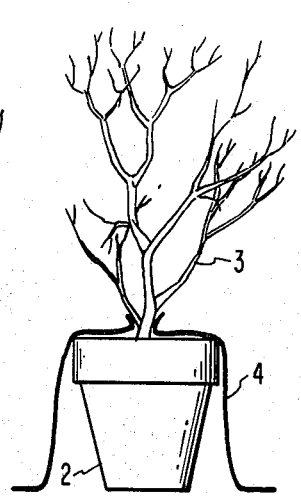

FIG. 2 of the drawings shows a plant similar to the one in FIG. 1 except that this plant in FIG. 2 is stripped of the webbing of its leaves.

Figure 3:
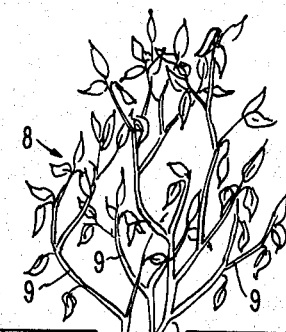

FIG. 3 shows a potted plant having a lower section of its branches converted to a root system suspended in air and sheltered from light.

Figure 4:
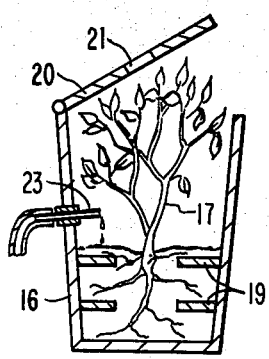

FIG. 4 of the drawings shows a trough with a door and a small plant inside.

Figure 5:
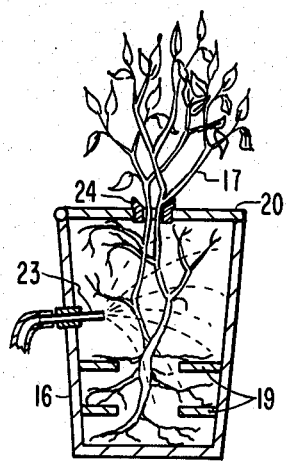

FIG. 5 of the drawings shows a trough with a closed door and a plant growing through the hole in the closed door.

FIG. 6 of the drawings shows cross sections of various shapes of troughs.

FIG. 7 shows a length of trough with an overhanging open door.

FIG. 8 of the drawings shows a trough with its overhead door closed.

FIGS. 9 and 10 show a trough adapted to contain a plurality of plants, with the trough door in open and closed positions.

Referring then to FIG. 1 of the drawings, the young, developing plant 1 is growing in a normal fashion in pot 2 according to any accepted procedure generally used for growing plants in containers. It is receiving water, air and light and its roots are receiving nourishment from any conventional media such as nutritious soil or cinders and clinkers periodically soaked with hydroponic solution. Other acceptable media are sand or gravel etc. that is periodically moistened with nutrient solution. The media is not shown but it is to be understood that it is in the container represented here as the flower pot 2. This drawing in this entire FIG. 1 is intended to represent also the process of development of the plant 1 from the time of its inception as a small seed embedded in a matrix of finely divided cinders, for example in a hydroponic container. This plant in the pot is meant to be a symbol of a normal plant growth.

Referring then to FIG. 2 of the drawings, the plant 3 is similar in every way to the plant 1 of FIG. 1 except that the plant 3 in this FIG. 2 is stripped of the webbing of its leaves or of the leaves themselves. Plant 3 like plant 1 is in a young and developing stage. However, the branches of this plant 3 are intended to remain approximately in their present position supported in the air by their trunk and their present root structure and while remaining in that position they are to be converted into a root system. The branches will be acting as roots and will in fact become roots. This conversion will take place without a change of position and without any transplantation. The conversion will be effected in place by means of etiolation, a mechanism which takes place when light is removed from the branches, and a continuing source of liquid nutrient is applied to them. The converted branches will not then subsequently be removed as in conventional air-layering but they will continue to remain in place and attached to the trunk. Shroud 4 keeps excessive spray from 2.

Referring then to FIG. 3 of the drawings, container 7 shields plant 8 from light and supports the plant in the area where branches extend through hole 9 in the top of this container. This plant 8 is similar in every way to plant 3 of FIG. 2 except that the plant 8 in this FIG. 3 is in a further stage of development than 3. The lower section of the branches of 8 are well along in the process of being converted to a root system supported in air. The upper section of the branches of 8 are continuing to grow as normal unconverted branches 9. But these branches 9 of plant 8 are growing at an increased rate because their growth is now supported by an augmented root system 10 which both during and after the conversion process continues to receive nutrient hydroponic solution from spray 11 and hose 12 which transports the nutrient from a conventional source not shown. The skirt 13 is optional and it is employed when ordinary soil is used in flower pot 14. The function of 13 in that instance is to prevent excessive soaking of the soil. In other embodiments in which the original or first system of plant roots develop from a seed supported in fine gravel or small clinker chips or cinder particles then 13 is not required and the liquid nutrient merely courses through these particles and flows out through the hole in the bottom of the flower pot and is collected in the bottom of the container for recycling.

Referring then to FIG. 4 of the drawings, the cross sectional view of trough 16 is used to illustrate that a trough may be used in place of a flower pot to provide a more effective large scale plant growing situation. The plant 17 is an example of one of many plants which may be started from seeds by the planting of the seeds in fine cinders in a row down the center of the trough. Support braces 19 attached to the side of the trough are optional but they are effective in assisting in initial root system to anchor itself in the trough 16. The developing roots of the initial root system are nourished by a slow flow of nutrient from nozzle 23. The branches and leaves which develop during the part of growth cycle which occurs naturally and before the natural cycle is drastically interrupted are sheltered by the sides of 16 and they receive light and air through the open door 20. This door 20 may be opened to various degrees to admit various intensities of light or it may be closed periodically during this part of the cycle to keep out rain or dust. When 20 is temporarily closed for these reasons, small covers not shown may be placed over the holes 21 which extend through the center of 20 at intervals. When the small plants within the trough 16 have grown to a height slightly about the level of the top of 16 then the door 20 is closed for the remainder of the plant's life and the top of each plant represented by plant 17 is allowed to grow through the hole in the door above it such as hole 21.

Referring to FIG. 5, the same door 20 is in its second and closed position which excludes light. By nourishing the branches with nutrient in the absence of light a process similar to air-layering begins to take place and the branches are converted to a new or secondary root system. This new root system then also supports the new branches and and leaves that grow into the light through hole 21 in cover 20. The branches that grow through 21 may be secured to 20 for support by 20 by the use of light packing between the branches and the sides of the hole 21. Any type of light resilient material such as styrofoam or polyurethane foam or twine or cloth may be used for packing support 24. Conventional supports may be added for various plants such as tomatoes according to standard practice of the art after the plant has grown to a considerable length beyond the top of 20. These additional supports are not shown because they are well understood in the art. The nourishing of the branches with nutrient solution during this part of the growth cycle after the trough door is closed may be achieved in various ways in different embodiments of the inventive concept. In one embodiment the slow flow of nutrient from nozzle 23, which previously wetted only the initial root system at the base of the trough, is now increased in volume to become a spray that wets the branches that are being converted to roots. In another embodiment the entire trough is filled with nutrient solution at this time and subsequently drained off. In yet another embodiment the entire trough is filled with nutrient solution and left in a filled condition while air is vigorously bubbled through nozzle 23. The trough in this FIG. 5 is the same as the trough 16 of FIG. 4. However, it is not intended to limit the inventive concept to the use of only one type of trough and examples of other suitable troughs are shown in subsequent figures. The supports 24 which brace the plant 17 against the hole 21 should not be so tightly packed as to greatly restrict the flow of air to the root system within the trough. Also provision for liquid flow is made by placing the length of the trough on an incline. Nutrient solution is thereby drained along the length of the trough. It can then be collected and recycled or it can be disposed of when it has become depleted of its nourishment value.

Referring then to FIG. 6 of the drawings, the trough 31 contains several inches of clinkers, sand or fine gravel as a root support medium 32 and nozzle 33 drips nutrient solution onto 32 to promote the development of seeds not shown which are placed in the supoort medium. Nozzle 33 continues to deliver nutrient as a very slow rate while roots form in 32 and until a plant grows to the top of 31 then door 34 is closed and the hydrostatic pressure within 33 is increased until a fine spray is formed.

Referring now to FIG. 7, trough 37 is used for a water culture or immersion type of system. Just a few inches of clinkers 38 submerged at the bottom of 37 serve to hold the seed in place. The seed is not shown but it is understood to be among the clinkers. The roots develop in the liquid nutrient and anchor themselves on the trough's support shelves 39. The nozzle 40 is used for air delivery as well as for nutrient delivery. While the plant grows within the trough the nutrient level is very low and just high enough to cover the initial root system. During this part of the cycle just sufficient air is delivered through 40 to aerate the nutrient solution in which it is submersed. Subsequently when the branches and leaves have grown to the top of the trough and the door 41 is closed then the air pressure in 40 is greatly increased and the air moving very rapidly up through the nutrient liquid produces a spray which aerates this liquid and soaks the branches with it at the same time. Trough 37 acts as the nutrient reservoir which is drained periodically as it is depleted of nutritional value. At these times the nozzle 40 is used to fill the trough to its previous level by means of valving not shown and subsequently 40 is returned to an air delivery function in order to maintain the spray.

Now in regard to FIG. 8 the trough 43 is provided with a shelf 44 having a hole in its center to receive a flower pot 45. A plant, the same as plant 1 of FIG. 1 but not shown here in this FIG. 8 grows at first in the normal way in 45. When the branches of the plant attain a height near or above the level of the top of 43 the door 46 is closed with the uppermost branches extending through the hole 47. The spray 48 first sprinkles nutrient solution on the branches to convert them to an augmented root system and then continues to spray to cause the plant to grow bigger and faster with the augmented roots.

In the FIG. 9, the trough 50 has many positions along its length for multiple plants and nozzles not shown. Door 51 is in an open position for admitting light.

In the FIG. 10, the trough 50 is now shown with its door 51 in its closed position in which it is capable of supporting the branch-to-root conversion for multiple plants that can be made to grow within, along its length and having their branches supported by the holes 52 in door 51.

The drawings set forth a method of increasing plant growth rate and size by describing a simple procedure and apparatus for providing a highly efficient air-suspended root system and a root system with increased root mass. This method is applicable to most plants and it is a useful way of growing bushes and vines of all kinds and it is a good way of starting small trees, but it is an especially useful way of growing plants that are of a type which are easily layered because these can more readily develop roots from their branches. Some of these include Mulberries, Loganberries, Black or Purple Raspberries, Blackberries, Strawberries etc. Large tomato plants are readily grown in this way as are Currant shrubs and Blueberry bushes. Finally, besides the advantages of high density and rapid growing of plants, one embodiment of the basic concept provides an additional advantage. When this trough system is used out of doors, it can provide a means of early spring planting and a way to plant before the last spring frost. A temporary transparent cover is placed over the trough during the period its permanent cover is open. For a period the trough is thereby used as a hot box or planter box. Electrical heating tape placed in the base of the trough is then used to heat the trough while the young plants are growing in their natural cycle until they grow as high as the top of the trough. By that time the weather will be sufficiently warm to have removed the temporary transparent cover and then the trough's permanent cover can be closed to begin the branch conversion process. Hydroponic fluid lines such as hoses may be kept within the trough to prevent any freezing of solution during the early planting period.

I claim:

1. A method of growing hydroponic plants which augments the plant's root mass and suspends the roots for aerosol nutrification comprising:
   (1) growing a plant in a container such as a trough by supporting the seed and the roots developing from it in suitable nourishment in the base of the container and admitting air and sunlight to the plant within the container and
   (2) by allowing the plant to grow naturally until significant branch and foliage has formed,
   (3) excluding light from a significant portion of the lower branches by the use of a cover and at the same time,
   (4) periodically soaking the darkened portion of the branches with nutrient hydroponic solution, converting the branches to a suspended root system and
   (5) continuing the nutrient solution application to the newly formed roots for the life of the plant.

2. A method as in claim 1 in which the soaking of the darkened portion of the branches and the continuing nutrient solution application is the spraying of the branches with a fine mist of nutrient hydroponic solution.

3. A method as in claim 1 in which the soaking of the darkened portion of the branches and the continuing nutrient solution application to the newly formed roots is the immersion of the darkened branches and the newly formed roots periodically in nutrient hydroponic solution by filling the container in which they are suspended and subsequently draining the container.

4. A root mass augmentor and growth accelerator for hydroponically grown plants comprising:
   (1) a plant culturing and early growth stage protection means in the form of a trough having at its base projections and support materials on which the initial root system of the plant can find a firm purchase to support the plant as it grows branches within the enclosure of the trough, and
   (2) a plant root suspension means and a branch-to-root conversion means in the form of an adjustable cover capable of being fastened to the top of the trough and of being adjusted to provide various degrees of opening over the top of the trough for the control of light admittance to the trough during early growth of the plants within the trough in an early time period, and said cover being capable of further adjustment over the top of the trough as to exclude from contact with light and weather during a later growth period both the inclosure of the trough as well as a lower portion of branches of plants previously caused to begin to grow within the trough, said cover having openings and portions therearound adapted to support branches growing to a level above that lower portion of branches enclosed by the cover, and said branch-to-root conversion means being additionally in the form of a nutrient applicator capable of applying nutrient solution to roots embedded in the initial root support materials during the early time period and then of supplying nutrient solution to the branches to be converted to roots in the later period when the covered branches are being converted to roots, and
   (3) a suspended root continuing nourishment application means capable of applying both nutrient solution and air to the branches enclosed by the cover in the later time period when the branches shielded and held by the cover are converted into a suspended root system of the plant.

5. A root augmentor and growth accelerator for hydroponic plants as in claim 4 in which the nutrient applicator of the branch-to-root conversion means and the suspended root continuing nourishment application means is a spray nozzle attached to a nutrient solution delivery line and supported by a hole in the trough to which the nozzle is sealed, said nozzle being capable of receiving nutrient solution from the solution delivery line and of depositing the solution on the covered branches by converting the solution of the line into a fine mist and ejecting it against the branches.

6. A root augmentor and growth accelerator for hydroponic plants as in claim 4 in which the nutrient applicator of the branch-to-root conversion means and continuing nourishment application means is in the form of a nozzle attached to a liquid nutrient delivery line and supported in a hole in the wall of the trough to which said nozzle is sealed, the nozzle being capable of receiving liquid solution from the liquid nutrient delivery line and of periodically contacting the branches being converted to roots with the solution by filling the trough with the liquid nutrient periodically.

7. A root augmentor and growth accelerator for hydroponic plants as in claim 4 in which the nutrient applicator of the branch-to-root conversion means and the continuing nourishment application means is a nozzle capable of receiving liquid solution and air from liquid solution and air delivery lines to which the nozzle is attached and of contacting the converted branches with the nutrient solution by filling the trough through the nozzle and by bubbling air through the nozzle and through the solution in the trough to aerate the solution and the branches within the trough.

* * * * *